Figure 1:
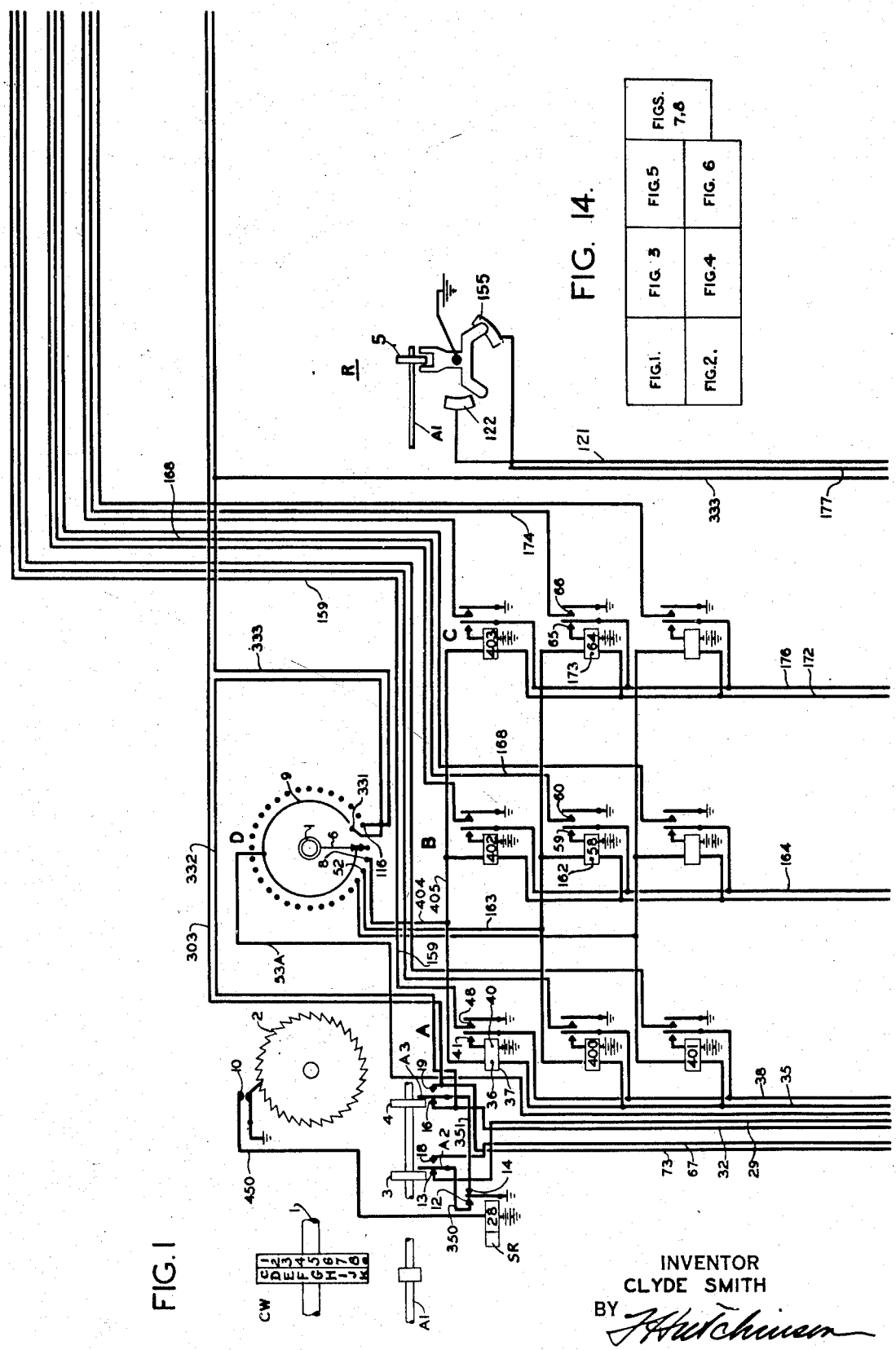

Oct. 23, 1934.  C. SMITH  1,978,094
STOCK QUOTATION DESK DISPLAY DEVICE
Filed April 10, 1930   8 Sheets-Sheet 1

INVENTOR
CLYDE SMITH
BY
ATTORNEY

Oct. 23, 1934.　　　　C. SMITH　　　　1,978,094

STOCK QUOTATION DESK DISPLAY DEVICE

Filed April 10, 1930　　　8 Sheets-Sheet 2

INVENTOR
CLYDE SMITH
BY *T. Hutchinson*
ATTORNEY

Oct. 23, 1934.  C. SMITH  1,978,094
STOCK QUOTATION DESK DISPLAY DEVICE
Filed April 10, 1930   8 Sheets-Sheet 4

Oct. 23, 1934.     C. SMITH     1,978,094

STOCK QUOTATION DESK DISPLAY DEVICE

Filed April 10, 1930     8 Sheets—Sheet 6

INVENTOR
CLYDE SMITH
BY
*F. Hutchinson*
ATTORNEY

Oct. 23, 1934.　　　　　C. SMITH　　　1,978,094
STOCK QUOTATION DESK DISPLAY DEVICE
Filed April 10, 1930　　　8 Sheets-Sheet 7
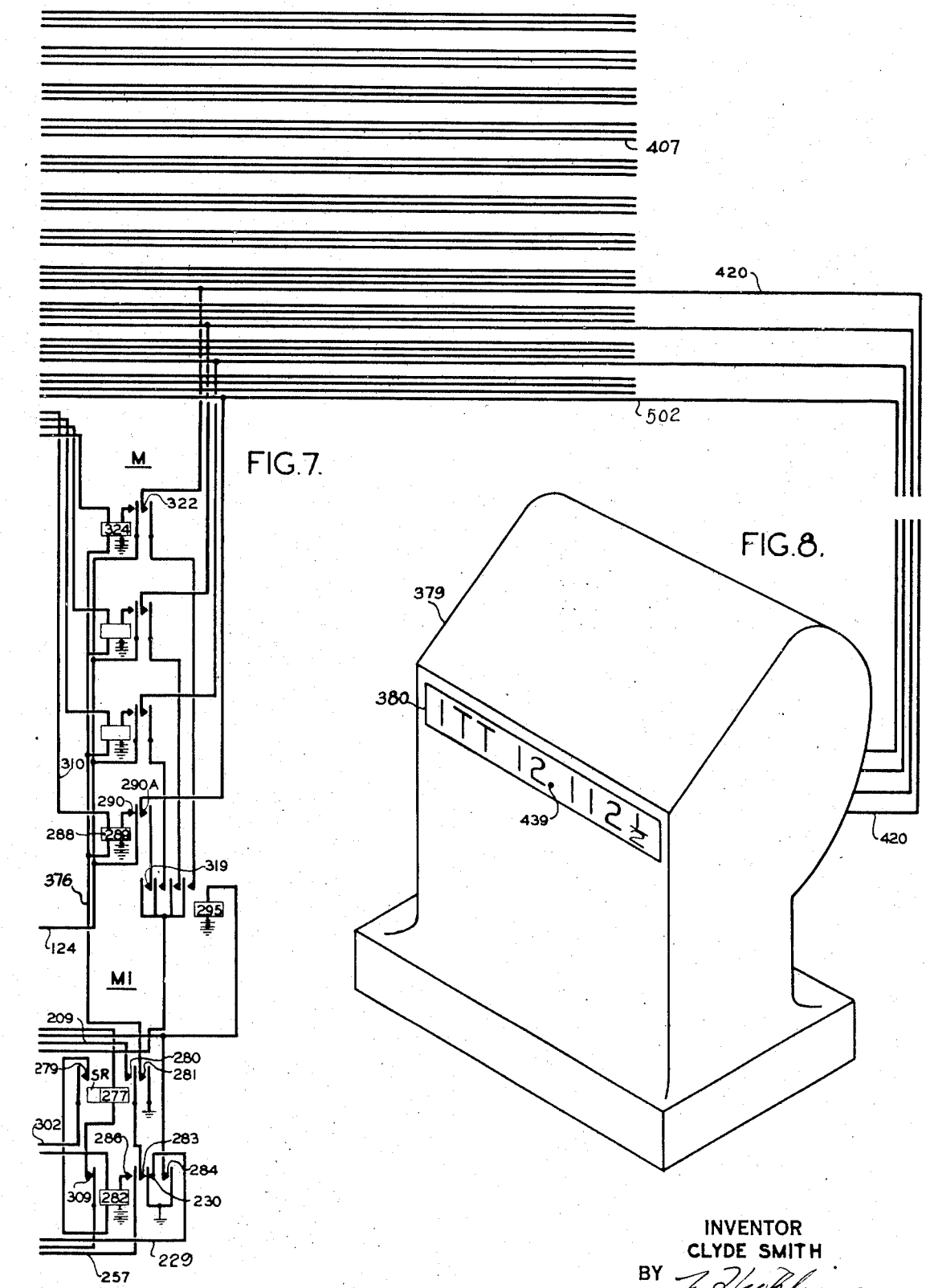
INVENTOR
CLYDE SMITH
BY
ATTORNEY Oct. 23, 1934.  C. SMITH  1,978,094
STOCK QUOTATION DESK DISPLAY DEVICE
Filed April 10, 1930   8 Sheets-Sheet 8
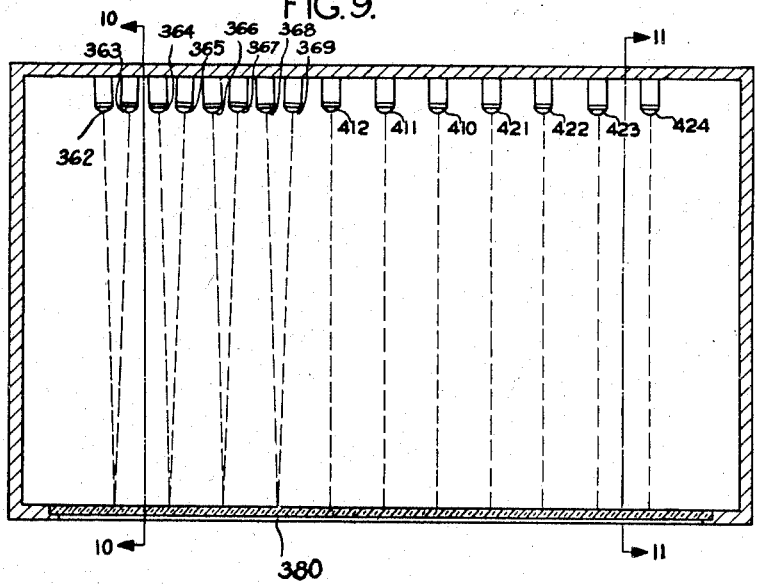
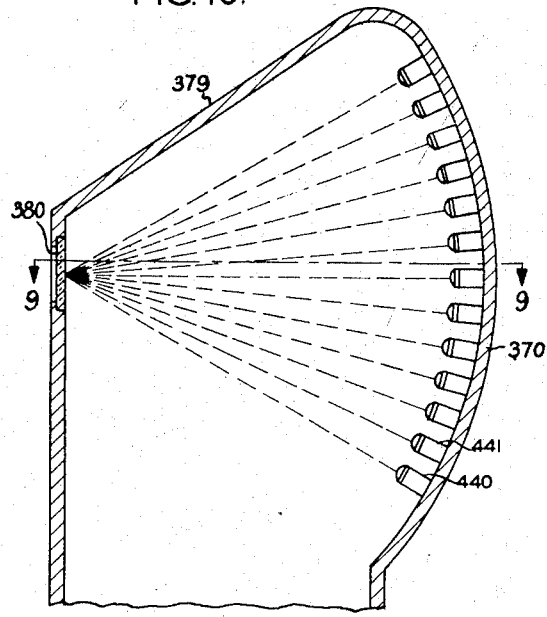
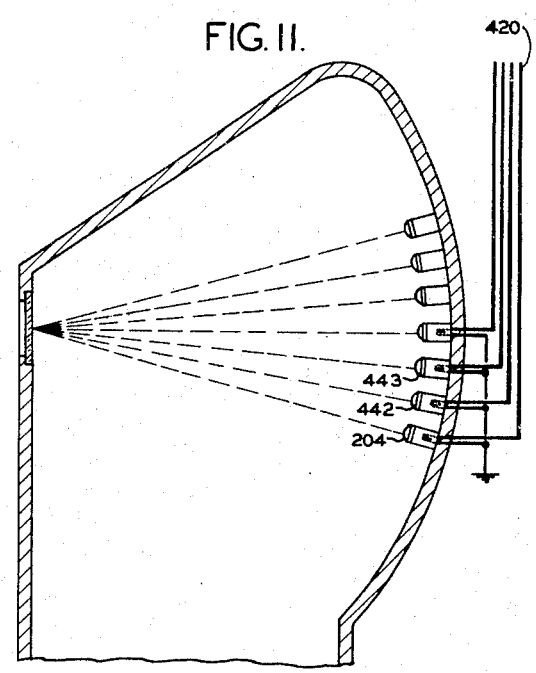
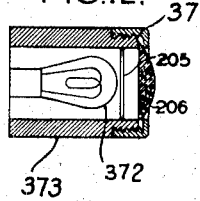
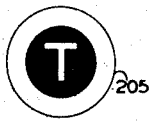
INVENTOR
CLYDE SMITH
BY
ATTORNEY Patented Oct. 23, 1934

1,978,094

UNITED STATES PATENT OFFICE 1,978,094

STOCK QUOTATION DESK DISPLAY DEVICE

Clyde Smith, Hopkinsville, Ky., assignor to International Communications Laboratories, Incorporated, New York, N. Y., a corporation of New York Application April 10, 1930, Serial No. 443,106

12 Claims. (Cl. 177—353)

The present invention relates to a system for translating code impulses to stationary illuminated letters and figures, and more particularly to a system for operating a plurality of stock quotation display devices from a common source comprising a ticker and one or more recording units, though it is to be noted that the invention is not limited in this respect.

At present, quotations are displayed on a screen in a broker's office. The quotations are printed on a transparent and continuously moving tape from which they are projected upon the screen across which they move and upon which they are visible to the broker's customers. Since, usually, there are a number of brokerage offices which display stock quotations in an office building, a proportionate number of tickers for operating stock display devices were required for one building. The present invention overcomes this disadvantage in providing one ticker and a circuit control unit for a building to operate a plurality of stock quotation display devices irrespective of their location in an office building.

Accordingly, an object of the invention is to improve the service as now given by the well known quotation projecting display device which employs movable ticker tape having its characters projected on and movably passed across a screen by providing a quotation display device without employing tape whereby quotations may be projected on a screen and appear stationary, and in such manner that the last quotation will be visible until displaced by the next quotation.

Where several display devices are common to one ticker and recording unit, the cost for service provided by the present invention will be appreciably less than the service as now given by other systems utilizing ticker tape for projecting the transactions. Consequently, another object of the invention contemplates provision of an economical service eliminating the need of transparent ticker tape as well as a plurality of tickers resulting in a saving on ticker rental and of costs for needless purchase of ticker tape.

Specifically, another object of the invention resides in the provision of a display device which is small, attractive, compact, pleasing to the eye and suitable for positioning upon a desk or desks of such persons who have need for quotations directly from the Exchange. Where, however, there is need to display quotations to a group of people, as in a board room of a brokerage office and such other places, for this purpose large display units would be provided.

In accordance with the invention, the ticker is utilized as the selecting element and the selection of various characters by the ticker sets up certain circuit combinations causing stock designations, the quantity of shares sold, and the price to be displayed on a screen or screens, remote from the ticker.

Broadly considered, the invention includes a plurality of columns or groups of alphabet relays, there being as many columns as there are letters in a maximum number of letters in a stock designation. For example, a stock designation may include four letters as WXYZ. There would be a column of letter relays which includes the letter W, a column including the letter X, etc. As many as twenty-six alphabet relays may be disposed in a column. Or a column of letter relays may be divided into two columns, each containing thirteen letter relays.

Each alphabet relay is electrically positioned to correspond to a letter. When the letter T, for example, has been selected, the relay T will become energized, causing the letter T to appear on the screen. When a letter relay in the first column is energized, the next column is ready for operation, and if the stock to be selected has a two-letter designation, a letter relay corresponding to the second letter will be energized. On the conclusion of the selection of the stock designation, the change from letter to figure selection sets up a shift circuit and quantity relays become effective.

Another aspect of the invention is the provision of means whereby letter designations of a stock quotation to be displayed are progressively projected on the screen while the quantity and price are progressively electrically recorded and held ineffective until the transmission of a special character impulse completing circuit combinations in response to which the quantity and price are projected simultaneously on the screen to complete the quotation.

Still another object includes a novel quotation portable display desk device comprising a screen member having a permanent character or dividing line thereon, providing means for separating the quantity portion of the quotation from the price, together with a spaced arcuate portion carrying a plurality of columns or groups of letter and figure lamps each associated with a stencil plate and lens whereby a stock designation, quantity and price of a quotation, or a portion of the latter, may be projected in a horizontal field of vision across the screen.

For selecting the quantity there are three columns of ten relays, one for the ten thousands, one for the thousands, and one for the hundreds. In selecting a quantity relay of the first column, the first digit in an order of numbers for the quantity is recorded. A selection of a relay of the second column will record the second digit in the order of numbers, etc.

A feature of the invention comprises means for deleting a quotation or portion thereof at any stage of the transmission where, say, the stock designation has been erroneously sent and displayed or, in an instance where the quotation has advanced to record quantity or price and either of the latter is inaccurate, or furthermore, where the completed quotation is recorded and displayed but the quantity or price or both are inaccurate.

Another feature of the invention comprehends means for displaying subsequent quantity and price quotations for the same stock without disturbing the stock designation appearing on the screen. In this way, the observer recognizes at a glance that following sales for the same stock are to be exhibited.

Figure 2:
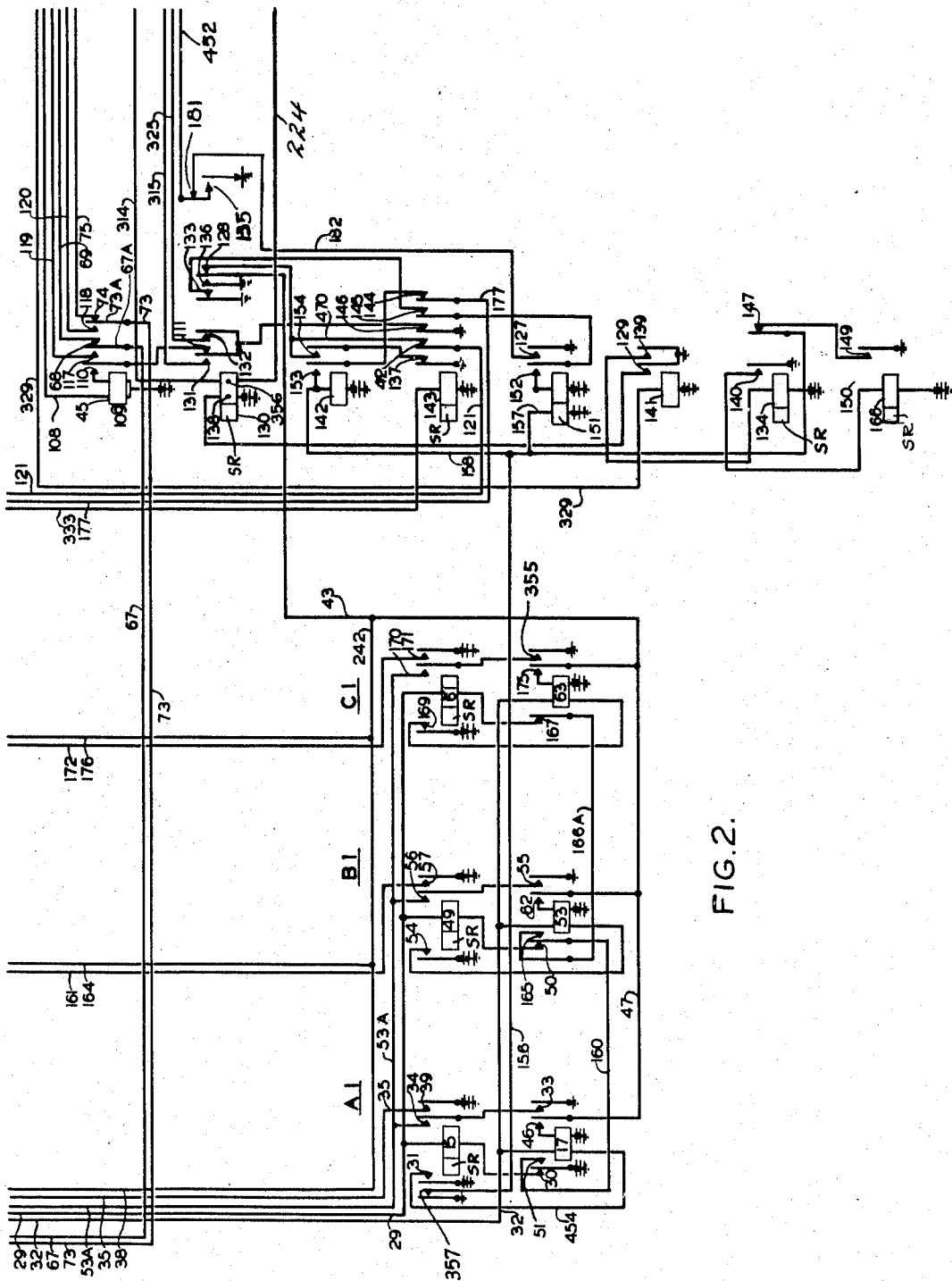
Figure 3:
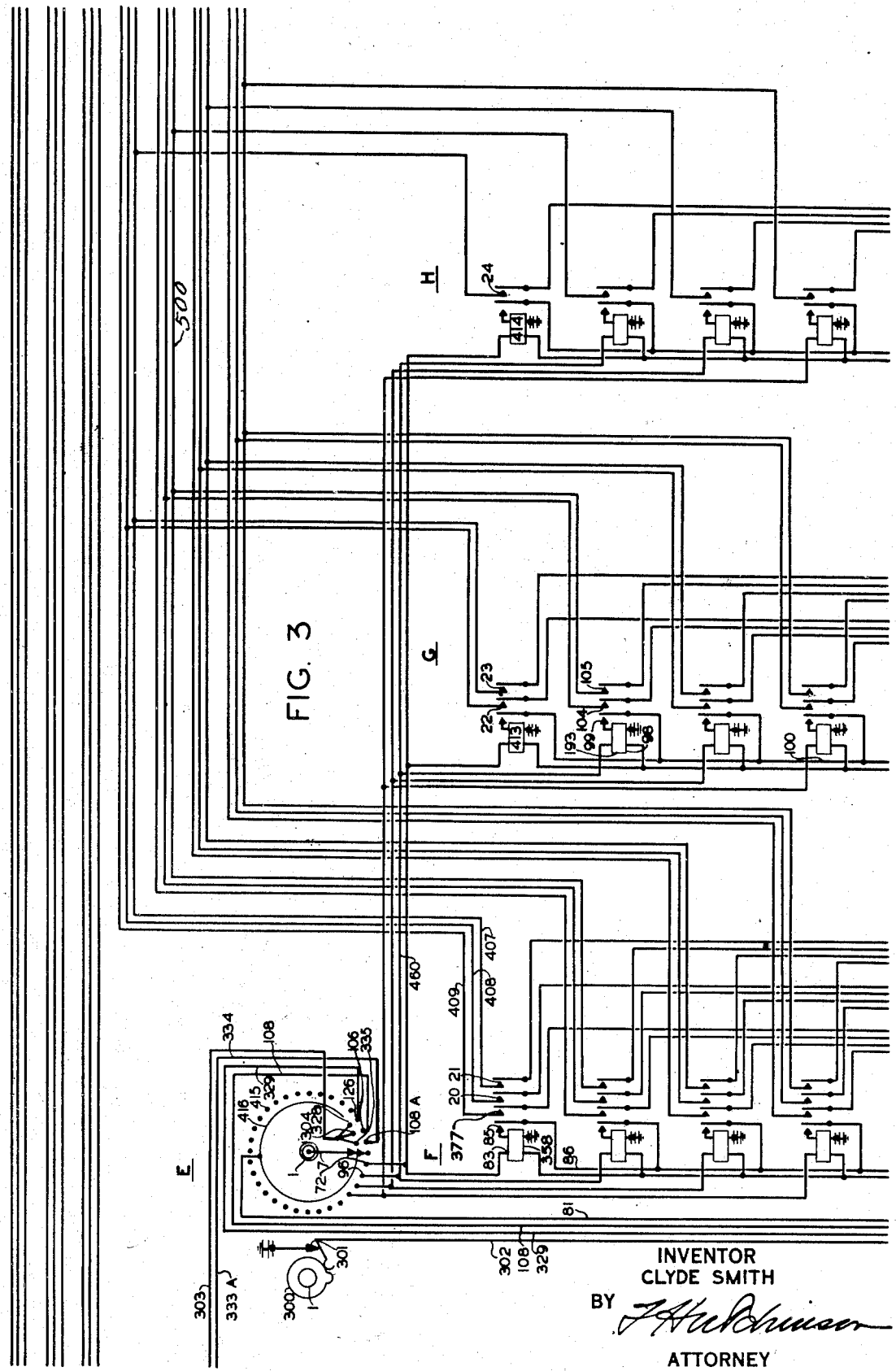
Figure 4:
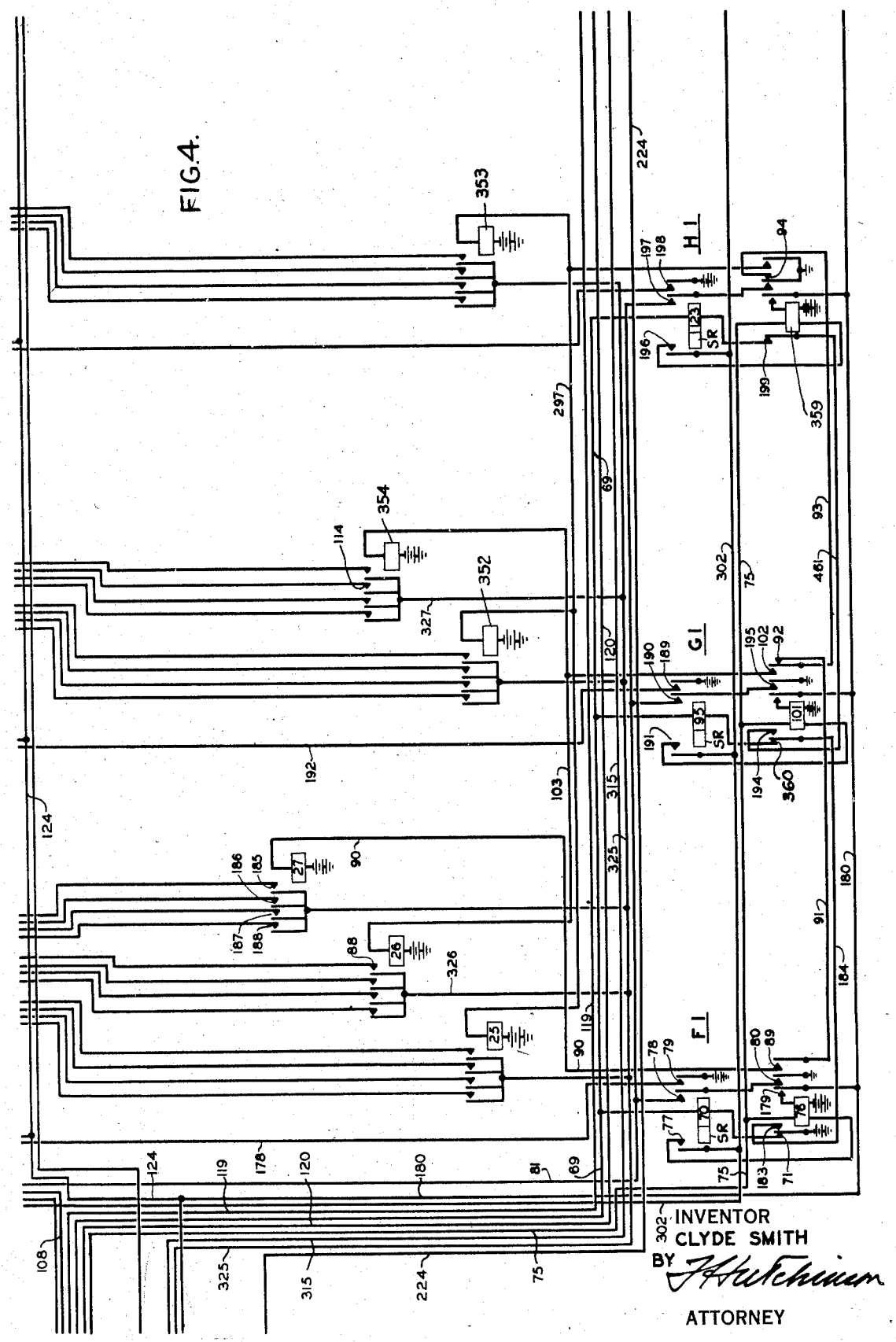
Figure 5:
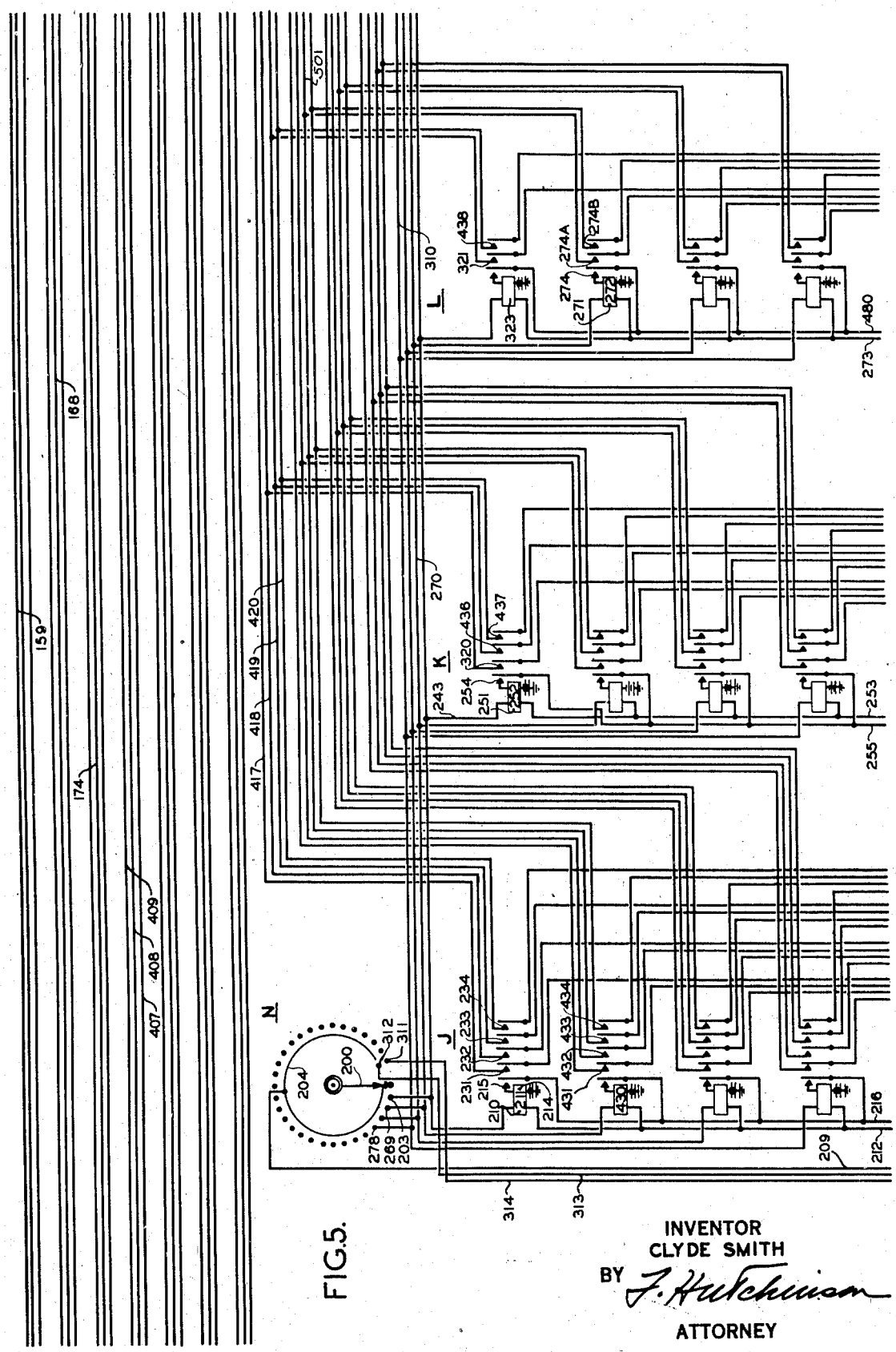
Figure 6:
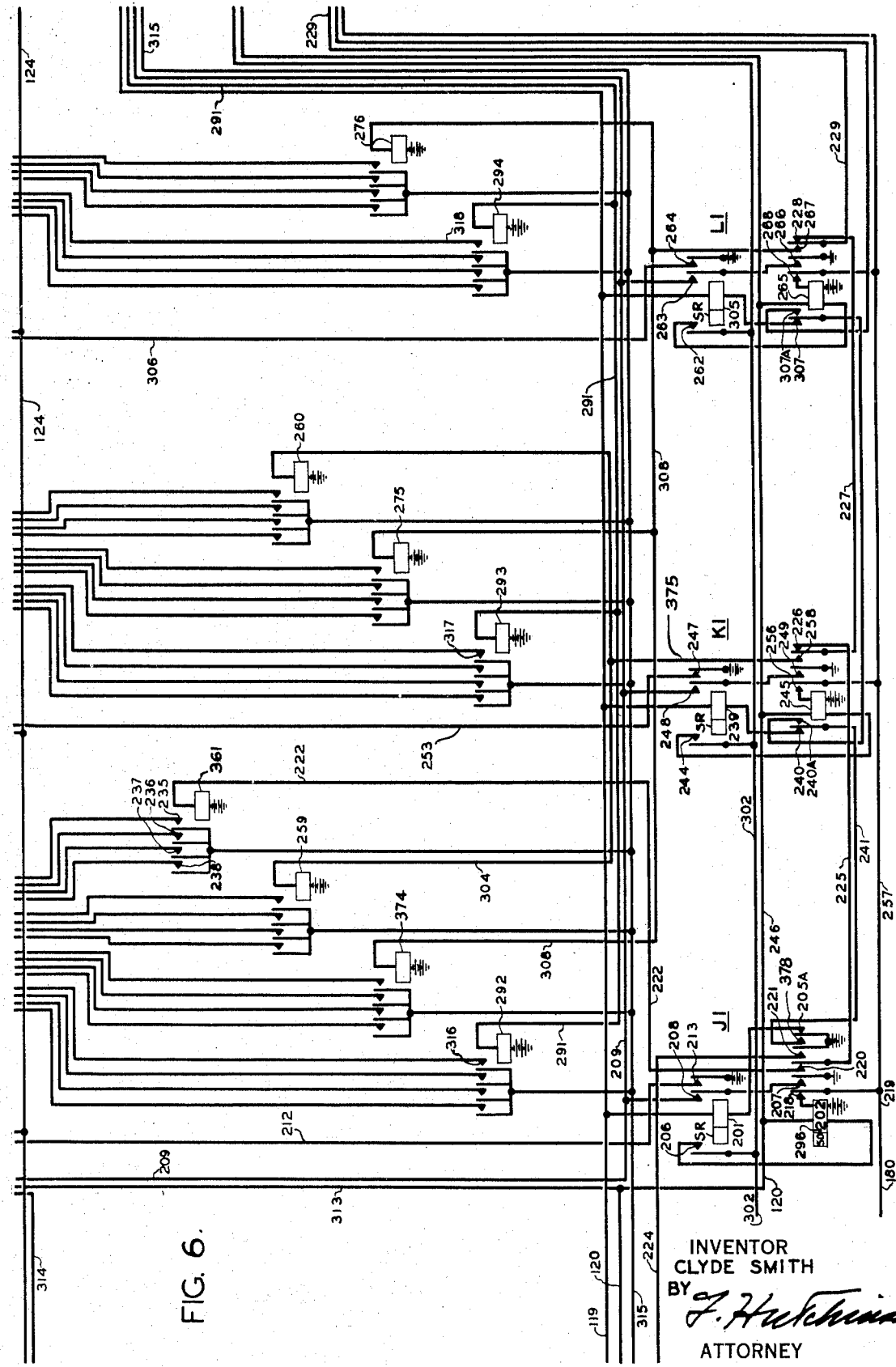

In the accompanying drawings there is shown, for purposes of illustration, the preferred arrangement of the present invention, disclosing a layout of a system for operating a plurality of quotation desk display devices, it being understood that the drawings show by way of example only one of the many embodiments of the invention wherein Fig. 1 illustrates schematically a character wheel including a fragmentary view of a stock ticker together with a portion of the system comprising the letter recording relays and associated switches, Fig. 2 illustrates schematically the letter control relays, the transfer, final, holding, wipe-out and repeat relays, Fig. 3 is a portion of the system showing the quantity recording relays and their common contact closing member, Fig. 4 shows the quantity slip relays and associated control relays, Fig. 5 shows a portion of the system illustrating the price recording relays and their common contact closing member, Fig. 6 shows the price slip relays and associated control relays, Fig. 7 shows one column of price recording relays and their common slip and control relays, Fig. 8 is a view in perspective of one of the quotation desk display devices with lamp circuits connected thereto, Fig. 9 is a sectional view taken along the line 9—9 of Fig. 10 in the direction of the arrows, Fig. 10 is a sectional view taken along the line 10—10 of Fig. 9 in the direction of the arrows, Fig. 11 is a sectional view taken along the line 11—11 of Fig. 9 in the direction of the arrows, Fig. 12 is a view showing one of the lamps associated with a letter stencil disposed in a lamp and lens mounting shown in section, Fig. 13 is a view of one of the stencils or object plates, Fig. 14 is a view showing an arrangement of views of the system above briefly described.

In the drawings, the character or type wheel CW of a telegraph ticker, shown in Fig. 1, is mounted on shaft 1 which is lengthened to carry toothed wheel 2 and wipers 6 (Fig. 1), 7 (Fig. 3) and 200 (Fig. 5) of the switches D, E and N respectively. The construction and operation of a telegraph ticker of the type employed in this invention may be understood by reference to U. S. Patent No. 1,365,004 issued in the names of A. T. MacCoy and R. F. Allen. For convenience and purposes of illustrating the ticker movement, the printing hammer A1 and the character wheel CW are disclosed. In practice, the character wheel CW need not be employed. The printing hammer shaft A1 is caused to shift from the letter position to the figure position by suitable means well known in the ticker or telegraph typewriter arts. Printing hammer shaft A1 is also lengthened to carry spaced contact operating members 3 and 4 to shift contact springs A2 and A3 whereby each opens one contact and closes another.

From the disclosure in the above-mentioned patent it is evident that in response to received signals the type wheel CW of the ticker can be variably positioned so that any desired letter or figure on the type wheel is in the printing position. It is likewise evident that the printing hammer shaft A1 can then be moved to the letter position to cause the selected letter to be printed, or can be moved to the figure position to cause the selected figure to be printed on a tape.

For selecting a stock designation, three columns of letter recording relays A, B and C are provided. As shown, each column contains three relays as 37, 400 and 401. However, in actual practice each column will be provided with as many relays as there are characters on the letter side of the type wheel.

Recording relays of column A are for the first letter in the stock designation. If, for example, a stock designation be ITT, the letter I would be selected from a letter recording relay of column A. Recording relays of column B are for the second letter in the stock designation. In the example chosen, the second letter, T, would be selected through the operation of the T recording relay of the second column. The column of recording relays C are for third letters in the stock designation. Thus T, the third letter of the stock designation ITT, would be selected from the recording relay of the third column. In cases where a stock designation is in more than three letters, the system may be extended by providing additional columns of recording relays.

Associated with each column of letter recording relays is a pair of primary and secondary control relays as A1, B1 and C1, each comprising a primary relay as 15 and a secondary relay as 17. Common to the group of relays comprising columns of recording relays A, B, C and pairs of relays A1, B1, C1 is switch D embodying a bank of stationary contacts as 8 arranged in a circle, there being a common contact for corresponding relays in columns A, B and C. For example, contact 8 is in circuit with conductor 404 which is multipled to conductor 405 and corresponding first letter recording relays as 37, 402 and 403. Second contact 52 is in multiple with corresponding second letter relays 400, 58 and 64, etc.

Common to all contacts, as 8, is a ring or common conductor 9 for completing a circuit through wiper 6, mounted on shaft 1, to the several contacts as 8 to ground a selected recording relay of columns A, B or C. Also mounted on shaft 1 is the toothed wheel 2 which rotates with shaft 1 and on each step closes contact 10, for energizing slow release relay 28 during movement of toothed wheel 2 which takes place during the transmission of an impulse or signal. Thus, as long as shaft 1 is in motion, relay 28 is energized and a primary control relay, as 15, is energized over a circuit including the alternate contact of relay 18. When a letter of the wheel CW has been selected, shaft 1 stops, and after an interval relay 28 releases, closing its normal contact, with the result that a corresponding secondary control relay, as 17, is energized over a circuit including the normal contact of relay 18. With relay 17 operated, and before the release of relay 15, a selected recording relay, as 37, is energized. This relay then locks up through its contact 41 until the completion of the lamp selecting operation. That is to say, a pair of primary and secondary control relays are operated at each letter selection to energize a selected recording relay of a corresponding column.

When the printing hammer A1 shifts from the letter position to the figure position, contact closing members 3 and 4 are displaced, to open the normally closed contacts controlled thereby and associated with conductor 29 connected to the primary control relays of pairs A1, B1 and C1, and with common conductor 32 multipled to the secondary control relays of pairs A1, B1 and C1 and then to close the normally open contacts controlled thereby and associated with common conductors 67 and 73, connected to the middle and outer contact springs of transfer relay 109, (Fig. 2).

The middle contact spring in its normal position is connected to conductor 69 to which are multipled relays 70, 95 and 123 of pairs of quantity control relays F1, G1 and H1. The outer contact spring in its normal position is connected to conductor 75 multipled to secondary quantity control relays 76, 101 and 359 of pairs of relays F1, G1, H1 respectively associated with columns of the quantity recording relays F, G and H. Only four quantity recording relays are disclosed in each column but in actual practice there will be ten relays in each column. The recording relays F, G and H and their control relays F1, G1 and H1 take up the quantity record and set up circuits for displaying the quantity involved in a transaction.

To display ten thousands in the quantity, a recording relay of column F is selected; to display thousands a relay of column G is selected; and to display hundreds in the quantity a relay of column H is selected. With the present system employing three columns of quantity recording relays, it is possible to display a quantity of 99,900, but it is evident that the system could be arranged to display a larger quantity without departing from the scope of the present invention.

In selecting a quantity recording relay, a relay of column F will be the first choice, a relay of column G the second choice, a relay in column H the third choice. Where the quantity is in hundreds only, a selected relay of column F may be employed to set up a circuit to light a selected hundreds lamp. If the quantity is in thousands or ten thousands, a selected relay of column F may also be employed to set up a circuit to light the thousands or ten thousands lamp.

For this purpose, each quantity recording relay 358 of column F includes three lamp contacts 377, 20 and 21. Hundreds contact 21 through conductor 407 is connected to the #1 lamp disposed in the lamp and lens mounting 410 (Fig. 9) of the hundreds quantity column. Contact 20 through conductor 408 is connected to a #1 lamp disposed in lamp and lens mounting as 411 (Fig. 9) of the thousands quantity column, and ten thousands contact 377 through conductor 409 is connected to the #1 lamp disposed in the lamp and lens mounting as 412 of the ten thousands quantity column of lamps.

However, one contact only of a selected recording relay will be effective, the selected contact being determined by the order of the digits in the quantity of the quotation, that is, if the quantity be in the hundreds, contact 21 will be effective, if in the thousands contact 20 is effective, and lastly, if the quantity be in ten thousands contact 377 is effective.

In column G each of the recording relays in addition to its locking contact has two other contacts as 22 and 23. In the H column each relay, in addition to its locking contact, is provided with one contact as 24. The recording relays for the G column have only two possible selections, namely, the thousands if the quantity be less than 10,000 shares, or hundreds if the quantity be less than 1000. The recording relays of the H column contain but one lamp contact, as these relays control only the hundreds quantity lamps.

In other words, if the quantity contains three integers, that is, one in the ten thousands, one in the thousands and one in the hundreds, a ten thousands lamp circuit is established through closure of a contact as 377, a thousands lamp circuit is established through closure of a contact as 22 and a hundreds lamp circuit through the closure of contact as 24.

Where the quantity contains digits in thousands and hundreds, only contacts as 20 and 23 are effective. If the quantity be in one integer in hundreds, then contact 21 only is effective. That is, a selected contact of relays as 358 may be operated to display either ten thousands, thousands or hundreds in the quantity, and relays as 413 may operate to display the thousands or hundreds in the quantity, but relays of the H group operate only to display hundreds in quantity.

To bring about this condition, each column of quantity relays includes one, two or three slipping relays as 25, 26 and 27. These relays control the several lamp circuits associated with the several quantity recording relays and are energized or deenergized according to the quantity. If the quantity be in hundreds only, relay 27 is energized. If the quantity be in thousands, relay 26 is energized, if in ten thousands relay 25 is energized. Furthermore, if the quantity be in three digits, for example 111(00) shares, relays 25, 352 and 353 will be energized. If the quantity be in two digits 11(00), relays 26 and 354 will be energized.

Common to the quantity recording relays of columns F, G and H and their corresponding columns comprising primary and secondary control relays F1, G1 and H1, is a switch E, comprising a bank of contacts as 415 arranged in a circle, a common conductor 416 and wiper 7 rotatably mounted on shaft 1, there being a common contact for corresponding quantity recording relays. Switch E extends ground through common 416, wiper 7, a selected contact as 72 to energize a selected quantity recording relay.

For recording the price, four columns of recording relays are provided, namely, J for the hundreds, K for the tens, L for the units and M for the fractions. In the drawings, four recording relays are shown in each column, but in actual practice, columns J, K and L will include ten relays and the fraction column M preferably seven. For each column of price recording relays there is an associated pair of control relays as J1 for column J, K1 associated with column K, L1 with L and M1 cooperating with relays of column M. These relays take up the price record and set up circuit combinations to display the price involved in a transaction or sale.

Each relay as 211 of column J includes four lamp contacts as 231, 232, 233 and 234. Hundreds contact 231 through conductor 417 is connected to the #1 lamp as 372 (Fig. 12) in the hundreds column of price lamps, each of which being disposed in a lamp and lens mounting as 421 (Fig. 9), representative of this column. Tens contact 232 is connected by conductor 418 to the #1 lamp arranged in lamp and lens mounting as 422 of the tens column of price lamps, of which mounting 422 is a part. Units contact 233 is connected by conductor 419 to the #1 lamp of a corresponding units column of price lamps disposed in the units lamp and lens mounting as 423, and fraction contact 234 is connected by conductor 420 to one-eighth fraction lamp disposed in a fraction column of lamp and lens mounting as 424. Similarly, contacts 431, 432, 433 and 434 of number two price recording relay as 430 are respectively connected to the number two lamps and the one-quarter fraction lamp (not shown) of the hundreds, tens, units and fraction column of price lamps. Other like contacts of other relays in column J are similarly connected to corresponding lamps in their respective columns of price lamps.

Relays as 252 of column K are provided with three lamp contacts as 320, 436 and 437. Tens contact 320 is multipled to conductor 418 associated with the #1 tens lamp disposed in the tens column of lamp and lens mounting as 422. Units contact 436 is multipled to conductor 419 associated with the #1 units lamp disposed in the units column of lens and lamp mounting as 423, and fraction contact 437 is connected to lamp circuit 420 which in turn is connected to the one-eighth fraction lamp of the fraction column of price lamps. Other like contacts of other relays of column K are similarly connected to corresponding lamps in their respective columns of price lamps.

Recording relays of column L are provided with two lamp contacts as 321 and 438. Units contact 321 is multipled to units lamp circuit 419 associated with the #1 units price lamp disposed in a lamp and lens mounting as 423. Fraction contact 438 is multipled to the fractions lamp circuit 420 associated with the one-eighth fraction price lamp of lamp and lens mounting as 424. The recording relays of column M include one lamp contact as 322. The lamp contact associated with recording relay 324 is connected to fraction lamp circuit 420. That is to say, corresponding lamp contacts of like price recording relays of all columns are multipled to the same lamp circuit. For example, fraction contacts as 322, 438, 437 and 234 are multipled to the common fraction lamp conductor 420. Likewise, units contacts 321, 436 and 233 are multipled to the units lamp circuit 419. The corresponding tens contacts as 320 and 232 are multipled to conductor 418. The hundreds contact 231 is connected to the #1 lamp hundreds price circuit. Lamp circuits 417, 418, 419 and 420 comprise one set. These are common to all the number one price recording relays as 211, 252, 323 and 324. Other relays of the same order of the columns of recording relays also include a set of lamp circuits for corresponding orders of price lamps.

The recording relays of the first column J will always record the first digit in the order of numbers in the price, that is, if the price be in a fraction only, a relay of column J will record the fraction. If the price be in a digit and a fraction, a relay of column J records the digit, and the fraction is recorded by a relay of column K. Where a quotation is in two digits and a fraction, a relay of column J records the first digit in the order of numbers and a relay of column K records the second digit in the order and a relay of column L records the fraction. Where the price contains three integers and a fraction, a relay of each column is selected to record the price. That is to say, the same operating order prevails with the price recording relays as with the quantity recording relays. With this arrangement, no matter what the order of energization may be, the screen record will display the proper quantity and price designations.

To effect this condition, each of the columns of price recording relays cooperate with one, two, three or four slip relays. For column J, four slip relays 292, 374, 259 and 361 are provided; for column K, there are three slip relays as 293, 275 and 260; for column L, two, namely 294 and 276, and one, 295, for column M. The price slipping relays control the several associated lamp circuits and are energized or deenergized according to the price. If the price be in a fraction, only relay 361 (Fig. 6) is energized. If the price be in a unit and fraction, relays 259 and 260 are effective. If the price be in tens, units and a fraction, relays 374, 275 and 276 are effective, and if the price be in three digits and a fraction, relays 292, 293, 294 and 295 are energized.

Switch N associated with the price recording and their control relays extends ground through wiper 200 to one of its several associated contacts as 203 to energize a previously selected price recording relay of the several groups of price relays.

The display device for exhibiting the quotations comprises a housing 379 (Figs. 8–11) provided with a ground glass screen 380 and fifteen columns of lamps disposed in lamp and lens mountings, namely, two columns as 362 and 363 of thirteen mountings, each for the first letter of the stock designation, two columns as 364 and 365 of thirteen lamps each for the second letter of the stock designation, two columns 366 and 367 of thirteen lamps each for the third letter, two columns 368 and 369 of thirteen lamps each for the fourth letter in the stock designation, three columns 412, 411 and 410 of ten lamps each for the quantity and four columns 421, 422, 423 and 424 for the price. Except for the last column, M, which includes seven lamps to exhibit fractions in eighths, the other columns, namely the quantity and price lamps, each contain ten lamps.

Each lamp as 372 (Fig. 12) of all columns is suitably supported in a tubular mounting as 373, preferably secured on an arcuate rear wall 370 of the display casing 379. A lens as 206 is supported at one end of the mounting and is detachably secured thereto by the flanged ring 371. Disposed between the lens and lamp in each mounting and removably secured thereto is an object or stencil plate as 205. The image of the designation on the stencil plate, whether letters or figures, is projected on the screen by its associated lens. Screen 380 of the quotation display device 379 includes a period as 439 or may be provided with a dividing line (Fig. 8) which is preferably affixed thereto. To the left of the period or dividing line quantities are displayed, and to the right prices are exhibited.

In Fig. 9, eight columns of thirteen letter lamp mountings are shown. Each includes a letter stencil. Lens of mounting 440 Fig. 10 would project letter A on screen 380; lens of 441 would project B, etc. The curvature of rear wall 370 is designed so that all the images as developed by the several lenses of associated stencils fall longitudinally of the screen and in alinement. In Fig. 11, the seven lens and lamp mountings shown include fraction stencils. Lens of mounting 204 projects one-eight on the screen; lens of mounting 442, one-quarter; lens of mounting 443, three-eighths, etc. The quantity and price lamp and lens mountings each include a stencil stamped out for figure display on the screen.

In Fig. 3 are shown the transfer 109, final 130, repeat 141, wipeout 143 and holding relays 142 and 151. The transfer relay shifts the operating circuits 67 and 73 from the quantity control relays F1—H1 to the price control relays J1—L1; the repeat relay releases previously selected quantity and price recording and control relays when a series of successive sales are to be displayed for the same stock. Also the holding relays serve to release all relays at the end of complete quotation. The wipeout relays release such relays as may have been energized during the period of transmission, if an error is made in transmission.

Where quotations are recorded on tape, a period is printed to separate the quantity from the price in a sale or series of sales. With the present invention, a code signal is transmitted to select the period which is on the figure side of the character wheel CW, but instead of printing a period, a special contact is selected. This contact is shown at 106 on switch E. In sending an impulse corresponding to a period, wiper 7 stops on contact 106 which grounds conductor 108, energizing transfer relay 109.

Transfer relay 109 in its normal or unenergized position connects conductors 67 and 73 to conductors 69 and 75 associated with the primary and secondary quantity control relays F1, G1 and H1; but when energized transfer relay 109 disconnects conductors 67 and 73 from 69 and 75 and connects them (67 and 73) to conductors 119 and 120 associated with the primary and secondary price control relays J1, K1, L1 and M1.

At the conclusion of each quotation, the final relay 130 is energized a measured length of time from the special character contact 311 of switch N for the purpose of holding closed the circuits of the selected character lamps after the complete record has been taken up by the recording relays. The final relay is effective only on full quotations, namely, when the relay setting for an entire quotation is released or succeeded by another complete quotation on the same or another stock.

When final relay 130 is energized, ground is removed from locking circuit of transfer relay 109, which thereupon releases for the next operation. Closure of contact 135 of relay 130 grounds branch conductor 452 to which is multipled the common locking quantity and price recording relay circuit 124 and the common quantity and price locking control relay circuits 180 and 257, thereby holding energized such quantity and price recording and their control relays as have been energized. Closure of contact 132 of final relay 130 closes the common quantity lamp circuit 325. Closure of contact 131 closes the common price lamp circuit 315.

To display successive quotations for the same stock or commodity involving changes in quantity and price without releasing the letter recording relays, a repeat relay 141 is provided. This relay is operated from contact 126 of switch E for the purpose of releasing the quantity and price control and recording relays, previously selected on the preceding quotation. That is, a special character on the figure side of the character wheel is selected and when shaft 1 stops, wiper 7 engages contact 126, grounding repeat relay circuit 329, thereby energizing repeat relay 141.

Repeat relay 141 causes final relay 130 and slow-release relay 134 to energize. The energization of the final relay 130 causes the quantity and price lamps selected by the operated recording relays to be lighted, and operated letter, quantity and price recording relays as well as their associated secondary control relays to be held locked. The operation of the final relay 130 also causes the release of holding relay 151 and opens the holding circuit for the transfer relay 109 though that relay does not release at this time because its operating winding is closed through switch E. The repeat relay 141 also effects the operation of the slow-release relay 134 and the latter, in turn, causes the operation of slow-release relay 166.

Upon the reception of the next quantity signal, wiper 7 of switch E moves off contact 126, thus releasing the repeat relay 141 and the transfer relay 109; the latter upon its release reassociating the conductors 67 and 73 with the quantity control relays. The release of the repeat relay releases the final relay 130 and the relay 134. When, after an interval, the final relay 130 de-energizes, the prior release of holding relay 151 causes the operated quantity and price recording relays and their associated secondary control relays to be released, thus extinguishing the lighted quantity and price lamps on the display device 379, but the operated letter recording relays and their associated secondary control relays are held locked to be released at a later time. Relay 134, which is timed to release after the final relay 130, but before the release of relay 28, then releases, causing, in turn, relay 166 to release. Relays 166 and 134 co-operate to complete a parallel operating circuit for both the holding relays 142 and 151. Upon the release of relay 166, which then occurs, holding relay 142 de-energizes, as its locking circuit is open at the figure shift contact 155. Holding relay 151 locks, however, to ground on the contacts of the final relay 130, and in locking applies ground to the conductor 134, thus preparing a locking circuit for the quantity and price recording relays and their associated secondary control relays.

As the circuit is now in the same condition as it normally is when ready for the selection of the quantity recording relays, the reception of this quantity signal and the remaining quantity and price signals will effect the lighting of the quantity and price lamps in the display device in the usual manner.

Wipeout relay 143 may be operated from contact 116 of switch D and contact 108A of switch E during the figure operation. Its function is to wipe out or delete at any stage of the transmission such characters as have been sent, in the event of an error in transmission. Wipeout relay, upon energization, opens the locking circuits of all relays that may at that time be in locked condition.

For holding energized on the shift from letters to figures, such letter relays as are energized on the letter selection, holding relays 151 and 142 are provided. They are energized first from contact 357 of the primary letter control relay 15 which is the first control relay of the series to become energized through conductors 156 and 158. Relay 151, upon energizing, locks up through its left-hand contact, a contact of relay 143 and contact 133 of relay 130. Relay 142 locks up at the beginning of a quotation, that is, on the selection of the stock letter designation. Its locking circuit includes its left-hand contact, a contact of relay 143 and contact 155 of switch R. Relay 151 may be unlocked by operation of either wipeout relay 143 or final relay 130. Relay 142 may be unlocked by the shifting of the printer hammer shaft A1 from the letter to the figure position which causes the opening of contact 155 of switch R, thus opening the locking contact of holding relay 142, or by the operation of wipeout relay 143 when contact 155 is closed.

Suppose it is desired to display a quotation, as for example, International Telephone and Telegraph at 112½ and 1200 shares sold. A ticker indicates this quotation as ITT 12.112½ where ITT is the stock designation, 12 the quantity in hundreds and 112½ is the price. Since with the present invention quotations are displayed in the same manner as the stock ticker prints, the first operation involves the selection of the letter I.

The operator transmits a set of impulses to select the letter I, setting in motion character wheel CW, its shaft 1 and ratchet or toothed wheel 2. The latter, in rotating, closes contact 10 energizing slow release relay 28, which opens its normal and closes its alternate contact.

Upon the energization of relay 28, primary control relay 15 operates over a circuit from battery, contact 30 of relay 17, winding of relay 15, conductor 29, contact 13, contact 12 to ground. Relay 15, at its contact 359, completes obvious parallel operating circuits for holding relays 142 and 151. Relay 142, upon operating, locks up over a circuit from battery and winding of relay 142, contact 144 of wipeout relay 143, conductor 177 to ground on letter contact 155 of switch R. Relay 151 locks up over an obvious circuit to ground on contact 133 of final relay 130. The operation of holding relay 142 applies ground to the locking conductor 143, thus preparing a common locking circuit for the subsequently operated letter recording and their associated secondary control relays. This ground may be traced from conductor 43, contact 128 of final relay 130, contact 154 of holding relay 142, to ground on contact 137 of wipeout relay 143.

At the selection of the letter I, shaft 1 stops with wiper 6 of switch D on contact 8, whereupon contact 10 remains open for a sufficient time to allow relay 28 to de-energize and open the circuit of relay 15. Since relay 15 is slow to release, it remains in operated position until after the closure of the normal contact of relay 28. Therefore, secondary relay 17 energizes over a circuit including a contact of relay 15 and the normal contact of relay 28. Relay 17 energized locks up through one of its own contacts and contacts of final relay 130, holding relay 142 and wipe out relay 143. Secondary control relay 17 in operating also opens a contact in the energizing circuit of primary relay 15. The closure of extreme right contact of relay 17 before the release of slow-to release primary relay 15 causes the operation of letter recording relay 37, (corresponding to letter I) over a circuit from battery, contact 39 of relay 15, conductor 35, energizing winding of relay 37, conductor 405, contact 8, wiper 6 and ring 9 of switch D, conductor 53A, contact 34 of relay 15 and contact 33 of relay 17 to ground. Relay 37 energizing locks up through its contact 41, conductors 38, 242 and 43, contact 128 of relay 130, contact 154 of relay 142, to ground at contact 137 of wipeout relay 143.

Letter recording relay 37 inclosing its contact 48 causes the I lamp in the first column of letter lamps to be lighted. Thus "I" of the stock designation is now displayed on screen 202.

The second operation calls for the selection of the letter T. The operator transmits a signal made up of a plurality of pulses and shaft 1 is rotated, as before in the selection of the letter I and slow-to-release relay 28 energizes upon closure of contact 10. Primary control relay 49 then operates over a circuit from battery through contact 51 of relay 17 (now locked up), contact 50 of relay 53, winding of slow-to-release relay 49, conductor 29, normal contact of A2 and alternate contact 12 of relay 28 to ground.

At the selection of the letter T, shaft 1 stops with wiper 6 of switch D on contact 52 and contact 10 opens, whereupon relay 28 deenergizes, causing the operation of secondary control relay 53 before the release of relay 49. Relay 53 locks up over its contact 62 and contacts of relays 130, 142 and 143. Operation of relay 53 causes energization of letter recording relay 58 of group B (before the release of relay 49) over a circuit including the right and middle contacts of relay 49 and right contact of relay 53. Relay 58 in operating locks up over its left contact, conductors 164, 242 and 43, and contacts of relays 130, 142 and 143. Relay 58 energized causes the lighting of the T lamp in the second group of letter lamps.

The second T of the designation ITT is now selected in the same manner as the previous two letters of this designation. Relay 28 energizes as before and slow-to-release relay 61 operates, during the rotation of wiper 6 of switch D. Upon selection of the letter T, wiper 6 stops on contact 52, contact 10 opens, relay 28 releases, and before relay 61 releases relay 63 energizes followed by the energization of letter recording relay 64 of group C. Both relays 63 and 64 lock up, and the latter causes the lighting of the T lamp of the third group of letter lamps. The stock designation is now complete and the letters ITT are displayed on the screen.

In the following operations quantity selections are made, namely for 1200 shares, this being quantity of the sale under consideration which is to be displayed, and as quantities less than one hundred are not exhibited, the thousands digit and hundreds of the quantity need be only selected. Consequently, the next operation requires the selection of the thousand digit, in this instance 1, and this transmission will shift printing hammer A1 from letter to figure position. For purposes of this description, it is assumed that the printing hammer shaft A1 shifts from letter to figure position, opening contacts 13, 16 and 155 and closing contacts 18, 19 and 122.

When the shaft A1 thus shifts, contact 155 is opened and contact 122 closed, the latter contact making before the former is broken. In opening contact 155, switch R removes ground from conductor 177, thus releasing the holding relay 142, the holding circuit of which was previously traced to contact 155. The ground on locking conductor 43 previously traced through contact 154 of holding relay 142 is, of course, removed from the locking conductor by the release of this holding relay. By the closure of contact 122, before the opening of contact 155, ground is maintained, however, on locking conductor 43, thus holding the operated letter recording relays and their associated secondary control relays in locked condition. This ground may be traced from conductor 43, contact 128 of final relay 130, contact 42 of wipeout relay 143, conductor 121 to grounded contact 122 of switch R.

In the selection of the numeral one for the thousands digit in the quantity shelf A1 is shifted to the figure position and rotates, closing contact 10 and relay 28 energizes. Energization of relay 28 causes operation of primary control relay 70 (which is slow to release) over a circuit from battery, normal contact of relay 76, winding of relay 70, conductor 69, contact 68 of transfer relay 109, conductor 67, contact 18 of A2, and contact 12 of relay 28 to ground.

When this selection of numeral one is concluded, wiper 7 of switch E stops on contact 72, and contact 10 opens, releasing relay 28. Then before the release of slow release relay 70, secondary control relay 76 operates over a circuit from battery, contact 301 controlled by cam 300 on shaft 1, conductor 302, contact 77 of relay 70, winding of relay 76, conductor 75, contact of transfer relay 109, conductor 73, alternate contact of A3, and normal contact of relay 28 to ground. Now with relay 76 energized and before the release of slow-to-release relay 70, quantity relay 358 of group F energizes over a circuit from battery, right contact of relay 70, conductor 178, energizing winding of relay 358, contact 72, wiper 7 and ring 416, of switch E, conductor 81, middle contact of relay 70, and contact of relay 76 to ground. Relays 76 and 358 lock up, the former over its locking contact and conductor 180, and the latter over its locking contact and conductors 86 and 124, then over conductor 452 and contacts of relay 130 and 151 to ground. Operation of quantity recording relay 358 prepares the number 1 thousands lamp for operation but the lamp does not light until the selection of the quantity and price is complete when operation of the final relay 130 causes the lighting of the selected lamps. Energization of relay 76 also causes operation of slip relay 27 over a circuit from battery, winding of relay 27, conductor 90, contact of relay 76, conductor 91, contact of relay 101, conductor 93 and contact of relay 359 to ground.

The numeral 2 in the hundreds of the quantity is now selected by the operator in the same manner as for the numeral 1 of the thousands. Shaft A1 is still in its shifted position and shaft 1 rotates as before, closing contact 10, energizing relay 28 whereupon slow to release relay 95 operates. Now when the selection is made shaft 1 stops with wiper 7 of switch E on contact 96, contact 10 opens and relay 28 releases. Before the release of relay 95, however, secondary control relay 101 operates over an obvious circuit. The operation of relay 101 is followed by the operation of quantity recording relay 98 over a circuit from battery, right contact of relay 95, conductor 192, energizing winding of relay 98, conductor 460, contact 96, wiper 7 and ring 416 of switch E, conductor 81, and contacts of relays 95 and 101 to ground. Relays 101 and 98 upon being energized lock up in the same way that relays 76 and 358 locked up. Relay 101 energizes, releases slip relay 27, and causes the operation of slip relays 26 and 354. The quantity lamps 1 and 2 in the thousands and hundreds, respectively, have operating circuits including, respectively, contact 88 of slip relay 26 and contact 114 of slip relay 354.

The operation of secondary control relay 101, in addition to the effects just mentioned, opens at its contacts 360 the operating circuit of primary control relay 95, thus preventing any further energization of that relay during the present selecting operation, and at its contact 194 relay 101 prepares an operating circuit for the next primary control relay 123. After an interval primary control relay 95 releases, thus preparing the next secondary control relay 359 for operation providing a quantity recording relay in group H is to be selected. In the present case, no recording relay in the hundreds quantity group H is to be selected, and consequently the secondary control relay 359 is prevented from operation in a manner to be described later.

Following the operation of the quantity recording relays B58 and 98, the operator transmits a series of pulses corresponding to the printing of a period or a special character to set wiper 7 of switch E on a special contact 106. Shaft 1 is rotated as before described and relay 28 is energized, causing the operation of the primary quantity control relay 123 over a circuit including contacts of relay 359, of locked up relays 76 and 101, of relay 109 and alternate contact of relay 28. Operation of relay 123, however, does not cause the energization of a quantity recording relay because wiper 7 of the switch E does not rest on a contact corresponding to a recording relay but on the special character contact 106.

Secondary control relay 359 likewise does not operate when shaft 1 comes to rest, for when wiper 7 of switch E is rotated until it reaches contact 106, cam 300 associated with switch E and rotating with shaft 1, opens contact 301, thus removing battery from conductor 302 and preventing the operation of the quantity secondary control relay 359 on this operation. It is evident, without further description, that whenever wiper 7 of switch E is rotated to select contact 106, cam 300 will similarly prevent the operation of any of the secondary control relays that have not been previously operated and locked. The function of cam 300, therefore, is to permit partial quantities to be first selected and later flashed on the display device. As will be explained later, cam 300 also permits a partial price to be selected and then flashed on the display device.

When shaft 1 stops with wiper 7 of switch E on contact 106, contact 10 opens, releasing relay 28, whereupon transfer relay 109 operates over a circuit from battery, energizing winding of relay 109, conductor 108, contact 106, wiper 7 and contact 304 of switch E, conductor 303, alternate contact of A3 and normal contact of relay 28 to ground. Transfer relay 109 thereupon locks up and transfers the connection of conductors 67 and 73 from conductors 69 and 75 to conductors 119 and 120 which are common to the primary and secondary price control relays 201, 202, 239, 245, 305, 265, etc.

It is to be noted that, when slow-release relay 28 releases and before transfer relay 109 energizes, ground on its contact 14 is momentarily extended over an obvious circuit to one terminal of the winding of secondary control relay 359. However, as cam 300 has disconnected battery from the other terminal of this winding, relay 359 fails to operate.

The next operation consists in the selection and recording of hundreds in the price to be displayed, which in this instance is 1. The operator then transmits a series of impulses for 1. Shaft 1 rotates, closing contact 10 and operating relay 28 as before described. Operation of relay 28 causes the energization of primary price control relay 201 over a circuit from battery, normal contact of relay 202, winding of slow release relay 201, conductor 119, contact of transfer relay 109, conductor 67, alternate contact of A2 and alternate contact of relay 28 to ground. At the completion of the selection for the hundreds in the price, shaft 1 stops with wiper 200 of switch N on contact 203, opening contact 10 and de-energizing relay 28.

Upon the de-energization of relay 28, secondary control relay 202 operates, before the release of slow-to-release relay 201, over a circuit from battery, contact 301 of cam 300, conductor 302, left contact of relay 201, energizing winding of relay 202, conductor 120, contact of transfer relay 109, conductor 73, alternate contact of A3 and normal contact of relay 28 to ground. Upon the energization of relay 202, and before the de-energization of slow-to-release relay 201, price recording relay 211 of hundreds group J operates over a circuit from battery, right contact of relay 201, conductor 212, energizing winding of relay 211, contact 203, wiper 200 and ring 204 of switch N, conductor 209 and contacts of relays 201 and 202 to ground. Relays 202 and 211 lock up; the former over its locking contact and conductor 180, and the latter over its locking contact and conductors 216 and 124, and thence over conductor 452 and contacts of relays 130 and 151 to ground. Operation of relay 211 prepares the lighting circuit of the No. 1 lamp of the hundreds price lamps. Operation of relay 202 also causes operation of slip relay 361 over a circuit from battery, winding of relay 361, conductor 222, contact 220 of relay 202, conductor 225, contact 226 of relay 245, conductor 227, contact 228 of relay 265, conductor 229 and contact 230 of relay 282 to ground.

Secondary control relay 202 has certain other functions that will now be mentioned. At its contact 378 it prepares an operating circuit for the next primary control relay 239, and at its contacts 221 it prepares an operating circuit for winding 356 of final relay 130, which relay is energized subsequently for the purpose of lighting the quantity and price lamps previously selected.

For selecting the tens figure 1 of the price to be displayed, the operator again transmits a series of impulses to select the number one character on the figure side of the character wheel. Shaft 1 thereupon is rotated, closing contact 10 and energizing relay 28. Primary control relay 239 then operates over a circuit from battery, contact 378 of relay 202, contact 240 of relay 245, winding of relay 239, conductor 119, contact 117 of transfer relay 109, conductor 67, contact 18, contact 12 of relay 28 to ground. When shaft 1 comes to rest and relay 28 releases, relay 245 is operated over an obvious circuit including battery on contacts 301 of cam 300 and ground on the normal contacts of relay 28.

With relay 245 operated and before relay 239 releases, price recording relay 252 of tens group K is operated over a circuit that may be traced from battery, contact 247 of relay 239, conductor 253, operating winding of recording relay 252, contact 203 of switch N, wiper 200, common 204, conductor 209, contact 248 of relay 239, contact 249 of relay 245 to ground. Secondary relay 245 locks up to ground on conductor 180 and relay 252 locks up to ground on conductor 124. After an interval primary control relay 239 releases, thereby preparing the next secondary control relay 265 for operation after the actuation of its associated primary control relay 305. Relay 245, upon operating, prepares through its contacts 240A a circuit for operating the next primary control relay 305 upon the next energization of relay 28; at its contact 240 it opens the operating circuit of primary control relay 239, preventing further energization of that relay; at its contact 226 opens the operating circuit of slip relay 361 releasing this relay; and at its contacts 258 completes parallel operating circuits for the slip relays 259 and 260. Upon the release of slip relay 361, the circuit prepared for the first fraction lamp through contacts 234 of relay 211 is opened, and by the operation of the slip relays 259 and 260, one circuit is prepared for the first units lamp on the display device through contacts 233 of relay 211 and another circuit is prepared for the first fractions lamp of the display device through the contacts 437 of relay 252.

To record the units of the price, the operator transmits a signal corresponding to the figure 2. Shaft 1 is rotated and relay 28 accordingly energized, with the result that primary control relay 305 in group L1 is actuated over an obvious circuit upon the energization of relay 28. Shaft 1 is stopped with brush 200 of switch N on contact 269. After an interval relay 28 releases effecting the operation of secondary control relay 265 in a manner evident from the preceding description.

While both control relays 305 and 265 are operated, the units recording relay 272 in group L is operated over a circuit that may be traced from battery, contact 264 of relay 305, conductor 306, operating winding of relay 272, conductor 270, contact 269 of switch N, wiper 200, common 204, conductor 209, contact 263 of relay 305, to ground on contact 266 of relay 265. The relay 265 locks up to ground on locking conductor 180 and the relay 272 locks up to ground on locking conductor 124. After an interval, primary control relay 305 releases, preventing by the opening of its contact 262 any further energization of the operating winding of relay 265 and thus preparing the next secondary control relay 282 for operation after the actuation of its associated primary control relay 277, and by the opening of its contacts 263 and 264 preventing any further operation of a recording relay in group L upon this operation. Relay 265, upon operating, opens at its contacts 307 the operating circuit of the primary control relay 305, thus preventing any further operation of this relay during the present selection cycle; at its closed contact 307A prepares an operating circuit for the next primary control relay 277; at its contacts 228 opens the operating circuits for the slip relays 259 and 260, thus causing these relays to release; and at its contacts 267 completes parallel operating circuits for the slip relays 374, 275, and 276. Relay 374, in operating, prepares through contact 232 of relay 211 a circuit for the first tens lamp of the display device; relay 275, in operating, prepares through contact 436 of relay 252 a circuit for the first units lamp of the display device; and slip relay 276, in operating, prepares through contact 274B of relay 272 a circuit for the second fractions lamp of the display device.

The next operation involves the selection of the fraction ½ in the price. The operator transmits a signal to select the fraction ½ on the figure side of the character wheel. Shaft 1 rotates and relay 28 energizes with an effect similar to that previously described, namely, primary control relay 277 in group M1 is operated. At the conclusion of the selection for the ½ fraction, wiper 200 of switch N stops on contact 278 whereupon before relay 277 releases secondary control relay 282 operates and locks up. With relay 282 operated and before the release of relay 277 fraction recording relay 289 is energized and locks up. Relay 282, by opening its contact 230, releases slip relays 274, 275 and 276 and, by closing its contact 284, causes the operation of slip relays 292, 293, 294 and 295 over an obvious circuit.

Up to this point the stock designation, that is, ITT is displayed on the screen, and the quantity and price are not, but the quantity and price have been electrically recorded in selected relays of the several groups of recording relays. The several letters of a stock designation appear successively on the screen, and the several figures of the quantity and price are projected simultaneously upon the operation of the final relay.

To effect this result the operator transmits a special character impulse, setting shaft 1 in motion, though without effect on any of the primary price control relays as the operating circuits of these relays have been opened by the actuation of their associated secondary control relays. Shaft 1 stops with wiper 7 of switch E on contacts 106 and 304 and with wiper 200 of switch N on the contacts 311 and 312. When relay 28 releases, final relay 130 is operated over a circuit from battery, contact 221 of relay 202, conductor 224, right-hand winding of relay 130, conductor 314 of switch N, conductors 313 and 120, contact 118 of transfer relay 109, conductor 73, alternate contact of A3, and normal contact of relay 28 to ground. The operation of the final relay 130 does not at this time release the transfer relay 109 though the locking circuit of the latter is opened at contact 111 of the former relay, as the previously traced operating circuit of the transfer relay is closed through contacts 106 and 304 of switch E. The transfer relay, in fact, remains energized until the next rotation of the shaft 1.

In operating, the final relay 130, at its make-before-break contact 136, transfers the locking conductor 43 for the operated letter recording relays and their associated secondary control relays from grounded contact 155 of switch R to ground on contact 136 of the final relay 130. In addition, final relay 130 at its make-before-break contacts 135, removed ground at contacts 127 of holding relay 151 from the locking conductors 124 and 180 for the operated quantity and price recording and control relays, thus holding these relays in locked condition for the lighting of the lamps in the display device under their control. Finally, upon the opening of its contact 133, and after the closure of its contact 135, the final relay causes the release of holding relay 151, so that both holding relays 142 and 151 are now released.

Furthermore, with final relay 130 energized the selected quantity thousands and hundreds lamps 1 and 2, respectively, and the No. 1 hundreds, No. 1 tens, No. 2 units and ½ fractions price lamps are lighted. The circuits for the lighting of these various lamps are as follows:

*Quantity thousands lamp No. 1.*—Battery, lamp No. 1, conductor 408, contact 20 of relay 358, contact of relay 26, conductors 326 and 325, contact 132 of relay 130 and contact of relay 143 to ground.

*Quantity hundreds lamp No. 2.*—Battery, lamp No. 2, conductor 500, contact 105 of relay 98, contact 114 of relay 354, conductors 327 and 325 thence to ground through contacts of relays 130 and 143.

*Price hundreds lamp No. 1.*—Battery, lamp No. 1, conductor 417, contact 231 of relay 211, contact 316 of relay 292, conductor 315, contact 131 of relay 130 and contact of relay 143 to ground.

*Price tens lamp No. 1.*—Battery, lamp No. 1, conductor 418, contact 320 of relay 252, contact 317 of relay 293, thence to ground through conductor 315 and contacts of relays 130 and 143.

*Price units lamp No. 2.*—Battery, lamp No. 2, conductor 501, contact 274A of relay 272, contact 318 of relay 294, thence to ground through conductor 315 and contacts of relays 130 and 143.

*Price fractions lamp No. ½.*—Battery, conductor 502, contact 290A of relay 289, contact 319 of relay 295 thence to ground through conductor 315 and contacts of relays 130 and 143.

The stencils disposed in the lamp and lens mountings of the several lighted quantity and price lamps cause the selected quantity and price to be projected into the screen 380 of the display device 379 (Fig. 8) in the manner illustrated in the figure.

The selected quotation is displayed on screen 380 until the release of the final relay 130 upon the reception of a new quotation. When a letter selection is made for the new quotation, the printer hammer shaft A1 is shifted from the figure to the letter position, thereby opening the alternate and closing the normal contacts of switches A2, A3 and R. During this new letter selection the wipers of switches N and E are rotated, thereby opening the energizing circuits of final relay 130 and transfer relay 109. Transfer relay 109 releases immediately, thus reassociating conductors 67 and 73 with the primary and secondary quantity control relays. Relay 130, however, is slow-to-release, and hence remains energized for an interval after printing hammer shaft A1 shifts from figure to letter position. Upon the release of final relay 130 the following circuit changes occur: at its make-before-break contacts 128 locking conductor 43 for the operated letter recording and secondary control relays is connected over conductor 121 to figure shift contact 122, which contact being now open the letter recording relays are released, extinguishing the lighted letter lamps, and in addition the operated letter secondary control relays are released; at its contact 181 the control of locking conductors 180 and 124 is transferred to holding relay 151, and this relay being now de-energized the operated quantity and price recording and secondary control relays are de-energized, thus extinguishing the lighted quantity and price lamps; at its contacts 111 and 131 the final relay opens an additional point in each of the quantity and price lamp circuits, respectively. The screen 380 of the display device 379 is now dark and the system is, therefore, conditioned for the display of a new quotation. This new quotation will evidently be selectively displayed in the display device by the means and in the manner just described.

With the present invention it is possible to display a series of successive quotations on the same stock without extinguishing the lamps displaying on the screen 380 the letters of the stock abbreviation. Let it be assumed that after the display of the quotation of 1200 shares of ITT at 112½ it is desired to display a quotation of 1300 shares of ITT at 112¼.

After the price recording relays have been selected, in the manner above described, for displaying the first-mentioned quotation of 1200 shares of ITT at 112½ the repeat relay 141 is selectively operated instead of the final relay 130, which is operated in the case of an ordinary quotation to light the lamps of the display device corresponding to the selected quantity and price recording relays. The function of the repeat relay is to cause the energization of the final relay 130 to display the quantity 12(00) and the price 112½ as selected in accordance with the first quotation, to cause the release of the transfer relay, thus restoring the conductors 67 and 73 into association with the quantity control relays, and finally to effect the release of the operated quantity and price recording and control relays, thus deleting the quantity and price portion of the quotation displayed on the screen of the display device without releasing the letter recording and their secondary control relays, which cause the display of the stock abbreviation.

The printing hammer shaft A1 is left in the figure shift position and the operator transmits a special impulse to effect the operation of the repeat relay 141. Shaft 1 is rotated, energizing relay 28 which opens its normal and closes its alternate contacts. The energization of relay 28 is without effect, as the circuits of all the primary price control relays, with which the conductors 67 and 73 are now associated, have been opened by the operation of their secondary control relays. Shaft 1 stops with wiper 7 of switch E on contacts 126 and 328. Relay 28 now de-energizes, causing the operation of repeat relay 141 over a circuit from battery, winding of relay 141, conductor 329, contact 126 of switch E, wiper 7, contact 328 of switch E, conductor 303 and normal contact of relay 28 to ground. It may be noted at this point that wiper 200 of switch N is not resting on contacts 311 and 312, which correspond in position to contacts 106 and 304 of switch E, so that at this time the operating circuit of the transfer relay 109 is open, though its locking circuit is closed through contacts of the final relay 130.

Relay 141, in operating, completes at its contacts 129 an operating circuit for the final relay 130 and at its contacts 139 an operating circuit for the slow-release relay 134. Both of these relays operate over obvious circuits. The operation of the final relay 130, at its contacts 111 opens the locking circuit of the transfer relay 109 which thereupon releases, re-associating conductors 67 and 73 with the quantity control relays. In addition, the operation of the final relay 130 has the effects previously described, namely, it holds locked the operated letter, quantity and price recording and secondary control relays, and completes circuits for lighting the lamp of the display device corresponding to the operated quantity and price recording relays to cause the quantity and price of 12(00) 112½ to be displayed on the screen of the device alongside the previously displayed stock abbreviation ITT. Relay 134, in operating, causes the actuation of slow-release relay 166, both of these relays co-operating for a purpose to be mentioned later.

The system is now ready for the reception of the first quantity signal for the next quotation of 13(00) shares. When the thousands quantity signal 1 is received the shaft 1 is rotated, causing relay 28 to energize and wiper 7 to move off contacts 126 and 328 of switch E. As soon as the wiper 7 leaves contact 126, the repeat relay 141 releases, opening the operating circuits of the final relay 130 and the relay 134. It should be noted here that final relay 130 is timed to release before both relay 28 and relay 134. Upon the release of the final relay 130, its contact 128 makes-before contact 136 breaks with the result that the locking conductor 43 for the letter recording and secondary control relays is grounded at contact 122 of switch R instead of at contact 136 of the final relay, and the stock abbreviation is held displayed at the screen; at its contact 111 it restores the locking circuit of the transfer relay 109 in order that the transfer relay, when subsequently operated, can be locked up; at its make-before-break contact 181 it places locking conductors 180 and 124 under control of holding relay 151, and as this relay is now released these locking conductors are opened with the result that the quantity and price recording relays and their secondary control relays are released, upon which the quantity and price lamps are extinguished removing the display of the quantity and price from the screen 380 of the display device; at its contact 133 it prepares a locking circuit for the holding relay 151; and at its contacts 111 and 131 opens another point in the operating circuits of the quantity and price lamps, respectively.

After an interval relay 134 releases, upon which an obvious circuit is completed for operating the two holding relays 142 and 151. At the release of relay 166, which occurs after the release of relay 134, the holding relay 142 releases as its locking circuit is open at letter shift contact 155, the shaft A1 being now in figure shift position, but holding relay 151 again locks up to ground on contact 133 of the final relay 130. The operation of holding relay 151 again grounds locking conductors 124 and 180, so that the quantity and price recording relays and their associated control relays are again ready for selection. As relay 28 has not yet released, the primary quantity control relay 76 is operated over a previously traced circuit including the alternate contact of relay 28.

The system is now restored to the condition that it is normally in when an ordinary quotation is to be displayed. Consequently, the quantity 13(00) and the price 112¼ of the second quotation on ITT can be selected and displayed in the manner previously described.

Where it is desired to wipe out a quotation or a portion of a quotation because of an error in transmission, a wipeout relay 143 is operated, whereby previously selected letter control and recording relays or previously selected quantity or price recording and their control relays are disabled. For example, assuming that the quotation has advanced to the third letter group, namely, group C, and the letter recording relays 37, 58 and 64 and their secondary control relays 17, 53 and 63 are locked up. With this condition, printing hammer shaft A1 is in the letter position and the holding relays 142 and 151 are both locked up. The common locking circuit 43 for the letter recording relays and their secondary control relays is also grounded through contacts of relays 130, 142 and 143. It should be noted that contact 181 of relay 130 is effective only when the quotation has advanced beyond the letter stage.

The operator now transmits a special signal on the letter side and shaft 1 is rotated, energizing relay 28 without effect, but shaft 1 stops with wiper 6 of switch D on contacts 116 and 331 and relay 28 deenergizes. Wipe-out relay 143 now operates over a circuit from battery through the winding of relay 143, conductor 333, contact 116, wiper 6 and contact 331 of switch D, conductor 332, normal contacts of switch A3 and relay 28 to ground. The operation of wipe-out relay 143 releases holding relays 142 and 151 and the selected letter recording relays 37, 58 and 64 and their associated secondary control relays 17, 53 and 63.

If, however, the selection has advanced to the quantity or price when it is desired to wipe-out the selection, printing hammer shaft will be in the figure position. When the wipe-out signal is sent, the switch E instead of switch D will control the operating circuit of wipe-out relay 143. This circuit may be traced from battery, through winding of relay 143, conductors 333, and 333A, contact 108A, wiper 7 and contact 335 of switch E, conductor 303, alternate contact of switch A3 and normal contact of relay 28 to ground. As before operation of wipe-out relay 143, releases the two holding relays 142 and 151, and the selected letter recording and control relays and releases all selected quantity and price recording and control relays, and any operated slip relays, as well as transfer relay 109 if selection had advanced to the price stage.

As disclosed in the drawings, one quotation desk display device is shown, but it is to be understood that a plurality of such devices may be connected to the several sets of letter, quantity and price lamp circuits of the system herein described in detail. In this way, a single electrical recording system may be utilized to operate several devices simultaneously irrespective of their location provided, however, that their letter quantity and price lamps are connected to associated lamp circuits.

The above disclosure has been given by way of preference only for readily understanding the method and means employed in carrying out the principles of the invention, and while certain particular embodiments have been set forth and illustrated, it is to be understood that other modifications may be made within the scope of the appended claims.

What is claimed is:

1. In combination, a ticker responsive to received signals, a screen, a plurality of letter, quantity and price projector banks adapted when operated to project the letters of a stock designation, the quantity and the price of a stock on said screen, selective means controlled by said ticker for operating a predetermined projector in successive letter projector banks, for selecting and operating a predetermined projector in successive quantity and price banks, and additional means controlled by said ticker for simultaneously restoring said operated projectors to their unoperated condition.

2. In combination, a ticker responsive to received signals, a screen, a plurality of letter, quantity and price projector banks adapted when operated to project the letters of a stock designation, the quantity and the price of a stock on said screen, selective means controlled by said ticker for operating a predetermined projector in successive letter projector banks and for selecting and operating a pre-determined projector in successive quantity and price banks, and means common to said projectors and controlled by said ticker for restoring said operated selected quantity and price projectors alone to unoperated condition.

3. In combination, a stock ticker responsive to received signals, a plurality of letter recording relay groups normally controlled by said ticker, a plurality of quantity and price recording relay groups, a display device comprising a screen and a plurality of letter, quantity and price projectors, means whereby each letter projector is operable upon the energization of an associated letter recording relay to project the letter corresponding to said relay on said screen, means whereby each quantity and price projector is conditioned for operation by the energization of an associated quantity and price recording relay respectively, means whereby each quantity and price projector is adapted when operated to project a figure corresponding to its associated quantity and price recording relay, respectively, on said screen, means responsive to the operation of said ticker for energizing a predetermined relay in selected groups of said letter, quantity and price recording relay groups, and a final relay thereafter responsive to said ticker for operating the quantity and price projectors previously conditioned for operation.

4. In combination, a stock ticker responsive to received signals, hundreds, tens, units and fractions price projector banks, hundreds, tens, units and fractions groups of price recording relays, means common to said price recording relays and controlled by said stock ticker for selectively operating any one of the relays in successive recording relay groups, means for counting the number of groups in which a recording relay is operated, relay means operated by said counting means when a recording relay is operated in the hundreds group alone for causing said relay to control a corresponding projector in the units projector bank, other relay means operated by said counting means when a recording relay is operated in the hundreds and tens groups for causing the operated hundreds relay to control a corresponding projector in the tens projector bank and the operated tens recording relay to control a corresponding projector in the units projector bank, and additional relay means operated by said counting means when a recording relay is operated in each of the hundreds, tens, units and fractions groups for causing the operated relay in each group to control a corresponding projector in the projector bank of the same order.

5. In a stock quotation system, a display device having a screen and a plurality of projector groups each comprising a plurality of projecting means having characteristic indicia, a recording relay group corresponding to each projector group, connecting means whereby each recording relay in one group is adapted upon its operation to select a particular projecting means in one of said projector groups and connecting means whereby each recording relay in the remaining groups is adapted upon its operation to select corresponding projecting means in any one of a plurality of projector groups, receiving means operable in accordance with received signals, selective means, controlled by said receiving means, for operating a predetermined recording relay in each of a number of selected groups, additional means, controlled by said selective means, for determining the particular projecting means to be selected by any operated recording relay in said remaining groups, and relay means, thereafter controlled by said selective means, for effecting the operation of the selected projecting means to cause the projection of their characteristic indicia on said screen.

6. In a stock quotation system, a display device having a screen and a plurality of projector groups corresponding to the different orders of a quotation to be displayed on said screen, each group comprising a plurality of projecting means having characteristic indicia, a group of recording relays likewise corresponding to each order of said quotation, connecting means whereby each recording relay in the group of the lowest order is adapted upon its operation to select a particular projecting means in the projector group of the lowest order, connecting means whereby each recording relay in any group of a higher order is adapted upon its operation to select corresponding projecting means in any one of the projector groups of the same and lower orders, receiving means operable in accordance with received signals, selective means, controlled by said receiving means, for operating a predetermined recording relay in each of a number of selected groups, counting means, controlled by said selective means, for determining, in accordance with the number of operated recording relays, the projecting means to be selected by the operated recording relays in the groups other than the lowest order, and relay means likewise controlled by said selective means for causing the operation of the selected projecting means to effect the projection of their characteristic indicia on said screen.

7. In a stock quotation system, the combination of a plurality of letter, quantity and price recording relay groups, a display device comprising a screen and a plurality of letter, quantity and price projector groups, each comprising a plurality of projecting means, means whereby each letter projecting means is adapted upon its operation by the energization of a letter recording relay to project the letter corresponding to said letter recording relay upon said screen, connecting means whereby each quantity and price projecting means is selectable upon the energization of one of said quantity and price recording relays, respectively, receiving means operable in accordance with received signals, selective means, controlled by said receiving means, for causing the energization of a predetermined relay in successive groups of said letter, quantity and price recording relay groups, and relay means, thereafter under control of said selective means, for simultaneously operating the previously selected quantity and price projecting means to project simultaneously on said screen the quantity and price corresponding to the operated quantity and price recording relays, respectively.

8. In a stock quotation system, the combination of a display device having a single display position, stock abbreviation display means and quotation display means associated with said display device, receiving means operable in accordance with received signals, selective means, controlled by said receiving means, for selectively operating said display means to cause any stock abbreviation and any quotation thereon to be displayed in the single display position of said device, and additional means controlled by said selective means for releasing the operated quotation display means to remove the quotation displayed and for holding the stock abbreviation display means operated to continue the display of said stock abbreviation.

9. In a stock quotation system, the combination of a display device comprising a screen and a plurality of letter, quantity and price projector groups, each comprising a plurality of projecting means, corresponding letter, quantity and price recording relay groups, means whereby each letter recording relay is adapted upon its operation to cause the energization of a letter projecting means whereby the letter corresponding to said relay is projected upon said screen, means whereby each quantity and price recording relay is adapted upon its operation to cause the energization of a quantity and price projecting means, respectively, whereby the quantity and price corresponding to said relays are projected upon said screen, receiving means operable in accordance with received signals, selective means, controlled by said receiving means, for energizing a predetermined relay in successive letter, quantity and price recording relay groups, a first relay means adapted when actuated to operate simultaneously the previously selected quantity and price projecting means, and a second relay means, controlled by said selective means, for causing the operation of said first relay means and then causing the quantity and price projecting means to restore to normal and the letter projecting means to remain operated thereby retaining the stock abbreviation alone displayed on said screen.

10. In a stock quotation system, the combination of a display device having a single display position, stock abbreviation display means and quotation display means, receiving means operable in accordance with received signals comprising stock selection signals and special signals, selective means, controlled by said receiving means, for selectively operating said display means in accordance with received stock selection signals, to cause the display of any quotation on a plurality of stocks in said single display position, and means common to said display means and controlled by said selective means upon the reception of a special signal, for releasing said stock abbreviation display means when said means alone are operated, and for releasing both said stock abbreviation and quotation display means when both said means are operated.

11. In a stock quotation system, a display device having a screen, stock abbreviation display means and quotation display means, receiving means operable in accordance with received selection signals, comprising stock abbreviation, quotation and special signals, selective means controlled by said receiving means for selectively operating said stock abbreviation means in accordance with received stock abbreviation signals to effect the display of a predetermined stock abbreviation on said screen and for selectively conditioning said quotation display means, and additional means controlled by said selective means for operating the conditioned display means to effect the display of a predetermined quotation on said screen, said additional means being also effective when another quotation on the same stock is received to release said quotation display means and hold said stock abbreviation display means operated.

12. In a stock quotation system, a plurality of relay groups and a plurality of circuit groups, both corresponding to the different orders of digits, means whereby each relay in the group of the lowest order is adapted upon its operation to control a particular circuit in the circuit group of the lowest order, means whereby each relay in any group of a higher order is adapted upon its operation to control a corresponding circuit in the circuit group of the same or lower orders, receiving means operable in accordance with received signals, selective means, controlled by said receiving means, for selectively operating a relay in each of a number of selected groups, and counting means for determining in accordance with the number of operated relays the circuits to be controlled by the operated relays in the groups other than the lowest order.

CLYDE SMITH.